(12) United States Patent
Xue et al.

(10) Patent No.: US 12,063,888 B1
(45) Date of Patent: Aug. 20, 2024

(54) SELF-PROPELLED PICKING VEHICLE FOR PINEAPPLES BASED ON SCRAPER TRANSPORTATION

(71) Applicant: South Subtropical Crop Research Institute, China Academy of Tropical Agricultural Sciences, Zhanjiang (CN)

(72) Inventors: Zhong Xue, Zhanjiang (CN); Xiumei Zhang, Zhanjiang (CN)

(73) Assignee: South Subtropical Crop Research Institute, China Academy of Tropical Agricultural Sciences, Zhanjiang (CN)

( * ) Notice: Subject to any disclaimer, the term of this patent is extended or adjusted under 35 U.S.C. 154(b) by 0 days.

(21) Appl. No.: 18/632,313

(22) Filed: Apr. 11, 2024

Related U.S. Application Data

(63) Continuation of application No. PCT/CN2023/126647, filed on Oct. 26, 2023.

(30) Foreign Application Priority Data

Mar. 21, 2023 (CN) .......................... 202310278644.6

(51) Int. Cl.
 *A01D 45/00* (2018.01)
 *A01D 46/253* (2006.01)
(52) U.S. Cl.
 CPC ......... *A01D 46/253* (2013.01); *A01D 45/002* (2013.01)
(58) Field of Classification Search
 CPC ............................ A01D 46/253; A01D 42/005
 See application file for complete search history.

(56) References Cited

U.S. PATENT DOCUMENTS

| | | | | |
|---|---|---|---|---|
| 2,321,387 A | * | 6/1943 | Jackson ............... | A01D 45/002 198/611 |
| 2,576,991 A | * | 12/1951 | Bainbridge .......... | A01D 45/002 198/511 |
| 2,576,992 A | * | 12/1951 | Bainbridge .......... | A01D 45/002 198/586 |
| 3,273,735 A | * | 9/1966 | Kuo ..................... | A01D 46/243 198/589 |
| 3,548,950 A | * | 12/1970 | Phelan ................. | A01D 45/00 171/62 |

(Continued)

FOREIGN PATENT DOCUMENTS

| CN | 207927250 U | 10/2018 |
|---|---|---|
| CN | 212116241 U | 12/2020 |
| CN | 115735545 A | 3/2023 |

*Primary Examiner* — Thomas B Will
*Assistant Examiner* — Julia C Tran

(57) ABSTRACT

A self-propelled picking vehicle for pineapples based on scraper transportation is provided and includes a baseplate, a driving mechanism, and a propelling mechanism. The driving mechanism is disposed on the baseplate, the propelling mechanism is disposed at a lower end of the baseplate, and the driving mechanism is connected to the propelling mechanism. A front end of the horizontal chain conveyor is provided with a cutting plate. The cutting plate is provided with two disk blades, outer sides of the two disk blades are provided with dividers, and a fruit protector is disposed between the two disk blades. A fruit picking mechanism is disposed on an upper end of the fruit protector. The entire process has achieved automated pineapple picking, efficiency of picking and transportation is improved, and labor intensity of fruit farmers is greatly reduced.

4 Claims, 4 Drawing Sheets

(56) References Cited

U.S. PATENT DOCUMENTS

| | | | | |
|---|---|---|---|---|
| 4,292,784 A | * | 10/1981 | Abatti | A01D 67/00 53/391 |
| 6,199,703 B1 | * | 3/2001 | Boese | A01D 45/00 209/393 |

* cited by examiner

SELF-PROPELLED PICKING VEHICLE FOR PINEAPPLES BASED ON SCRAPER TRANSPORTATION

TECHNICAL FIELD

The disclosure relates to the technical field of agricultural picking, and particularly to a self-propelled picking vehicle for pineapples based on scraper transportation.

BACKGROUND

Pineapple, as a famous tropical fruit, is currently grown in about 70 regions and countries, accounting for approximately 5% of the world's total fruit production annually. Pineapple is one of the main fruits in the tropical fruit trade. Currently, except for a few orchards equipped with semi-mechanized auxiliary devices, manual harvesting is the main method. The cost of labor required for the entire picking operation in the short-term accounts for 40% of the total pineapple production cost. Pineapple farmers hope to change the current situation through mechanized management. The seasonality of the pineapple picking is strong, with only a peak harvest period of about half a month. The pineapple farmers need to pick tens of thousands of plants in a very short period, which makes the picking task extremely heavy. At present, for pineapple picking in China, except for a few areas equipped with the mechanized picking devices or the semi-mechanized auxiliary equipment, the rest of the operation methods are mainly manual harvesting. The development of corresponding pineapple picking machinery and equipment is of great significance in alleviating the shortage of labor resources, reducing the intensity of fruit farming operations, and improving the efficiency of pineapple picking and transportation.

In the related art, a Chinese patent with publication No. CN113728794B discloses a pineapple picking vehicle and a picking method. The pineapple picking vehicle includes a whole vehicle frame, a lifting mechanism, a picking mechanism, a displacement sensor, a V-shaped slot, an arc-shaped push plate, a transport mechanism, a sorting mechanism, a ball screw and a pull plate. The whole vehicle frame is movably supported on the ground, and the whole vehicle frame includes a blade collecting plate for collecting pineapple leaves and a collecting device for collecting pineapple. The lifting mechanism is raised and lowered in the whole vehicle frame based on the height of the pineapple. The picking mechanism is disposed in the whole vehicle frame to pick. The displacement sensor is disposed in the whole vehicle frame and forms a detection device for detecting the position of the pineapple with a sliding table. The V-shaped slot is disposed on a lifting platform to fix the root of the pineapple. The arc-shaped push plate is fixedly connected to a slider, and as the slider slides, the arc-shaped push plate applies torque to the pineapple to break the pineapple. The transport mechanism is disposed in the whole vehicle frame to transport the picked pineapples. The sorting mechanism is disposed in the whole vehicle frame to sort the pineapples transported by the transport mechanism. Two ends of the ball screw are supported on the whole vehicle frame through bearing seats. The pull plate is fixed at an end of a parallel four-bar linkage mechanism to divide the pineapples left and right into the collection device.

The above-mentioned Chinese patent mainly relies on the pull plate for picking, and the stalks and tail leaves of the picked pineapples still remain and need to be further processed. Therefore, the related art needs to be further improved.

SUMMARY

The disclosure is provided to address the technical issues raised in the background. Therefore, a self-propelled picking vehicle for pineapples based on a scraper transportation is needed to achieve the cutting work of stalks and tail leaves of the pineapples during picking pineapples.

To solve the technical issues, the disclosure provides a self-propelled picking vehicle for pineapples based on a scraper transportation, and the technical proposals are as follows.

The self-propelled picking vehicle for pineapples based on scraper transportation includes a baseplate, a driving mechanism, and a propelling mechanism. The driving mechanism is disposed on the baseplate, the propelling mechanism is disposed at a lower end of the baseplate, and the driving mechanism is connected to the propelling mechanism. A front end of the horizontal chain conveyor is provided with a cutting plate. The cutting plate is provided with two disk blades, outer sides of the two disk blades are provided with dividers, and a fruit protector is disposed between the two disk blades. A fruit picking mechanism is disposed on an upper end of the fruit protector.

In an embodiment, the fruit picking mechanism includes a first support, a second support, a rotating shaft, fruit picking plates and a power unit. The rotating shaft is rotatably fixed by the first support and the second support, and an end of the rotating shaft is connected to an output end of the power unit. The fruit picking plates are coaxially connected to the rotating shaft.

In an embodiment, the power unit includes a first belt pulley, a second belt pulley, a transmission belt and a fruit picking motor. The first belt pulley is coaxially connected to the rotating shaft, the first belt pulley is connected to the second belt pulley through the transmission belt, and an output end of the fruit picking motor is coaxially connected to the second belt pulley.

In an embodiment, the fruit picking plates are I-shaped picking plates, and materials of the fruit picking plates are non-rigid rubber products with certain stress.

In an embodiment, the two disk blades are driven to rotate by a cutting motor disposed on the cutting plate.

In an embodiment, a vertical rotating and lifting chain conveyor is disposed at a rear of the baseplate, and the horizontal chain conveyor is configured to convey picked pineapples to the vertical rotating and lifting chain conveyor.

In an embodiment, the horizontal chain conveyor and the cutting plate located in the front end of the horizontal chain conveyor are connected to the baseplate through a first hydraulic cylinder. The cutting plate disposed at the front end of the horizontal chain conveyor is adjusted through the first hydraulic cylinders to adapt to different cutting heights.

In an embodiment, impetus of the vertical rotating and lifting chain conveyor is distributed through a driving mechanism and transmitted using chain transmission. Chain conveyor scrapers are sandwich composite materials, a middle of each of the chain conveyor scrapers is a steel plate capable of providing a supporting force, an outside of each of chain conveyor scrapers is wrapped by a rubber flexible material to reduce mechanical contact with fruits and damage to the fruits.

In an embodiment, the horizontal chain conveyor and the vertical rotating and lifting chain conveyor have relatively independent transmission to rotate independently, and a height difference is provided between a tail end of the horizontal chain conveyor and the vertical rotating and lifting chain conveyor, and the height difference is in a range of 10-12 centimeters (cm) to ensure that the fruits fall without damage.

The beneficial effects of the disclosure are as follows.

The disclosure provides a self-propelled picking vehicle for pineapples based on scraper transportation. The propelling mechanism is driven by the driving mechanism to run, and the dividers is configured to separate adjacent intersecting blades. The fruit picking mechanism pulls leaves of the pineapple inside a range of two side of each divider towards the fruit protector, and uses the two disk blades to rotate to cut stalks and tail leaves of the pineapple, then the fruit picking mechanism pulls the leaves cut from the pineapple back towards the direction of the horizontal chain conveyor to achieve the transportation of the pineapple. The entire process has achieved automated pineapple picking, improving the efficiency of pineapple picking and transportation, and greatly reducing the labor intensity of fruit farmers.

BRIEF DESCRIPTION OF DRAWINGS

In order to provide a clear explanation of a specific embodiment of the disclosure or the technical solution in the related art, the following will briefly introduce the attached drawings required in the specific embodiment or the related art. In all drawings, similar components or parts are generally identified by similar reference numerals. In the attached drawings, each component or part may not necessarily be drawn to the actual scale.

Figure 1:
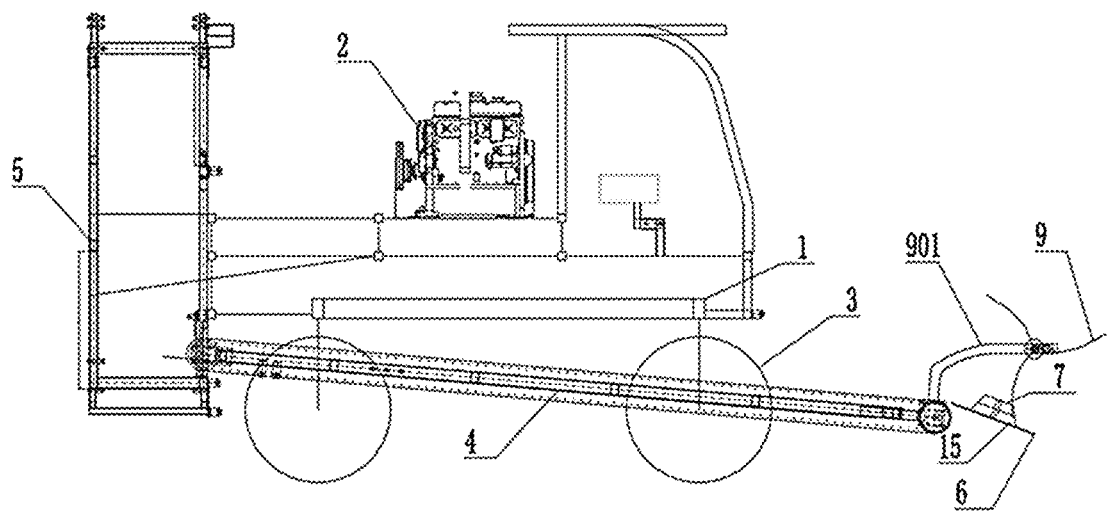
FIG. 1 illustrates a structural diagram of a self-propelled picking vehicle for pineapples based on the scraper transportation according to an embodiment of the disclosure.

Description of reference numerals: 1. baseplate; 2. driving mechanism; 3. propelling mechanism; 4. horizontal chain conveyor; 5. vertical rotating and lifting chain conveyor; 6. cutting plate; 7. disk blade; 8. fruit protector; 9. fruit picking mechanism; 901. first support; 902. second support; 903. rotating shaft; 904. fruit picking plate; 905. power unit; 9051. first belt pulley; 9052. second belt pulley; 9053. transmission belt; 9054. fruit picking motor; 10. first hydraulic cylinder; 11. second hydraulic cylinder; 12. chain conveyor scraper; 13. steel plate; 14. rubber flexible material; 15. cutting motor; 16. divider.

DETAILED DESCRIPTION OF EMBODIMENTS

Embodiments of the disclosure will be illustrated below by way of particular specific examples, and those skilled in the art can easily understand the other advantages and effects of the disclosure from the content disclosed herein. The disclosure can also be implemented or applied through different specific embodiments, and the details in the specification can be amended or modified based on different perspectives and applications without deviating from the spirit of the disclosure. It should be noted that, without conflict, the following embodiments and their features can be combined with each other.

In the description of the disclosure, unless otherwise specified, "multiple" means two or more, the terms such as "up", "down", "left", "right", "inside", "outside", "front end", "rear end", "head" and "tail" indicate orientation or positional relationships based on the orientational or positional relationships shown in the attached drawings, only for the convenience of describing the disclosure and simplifying the description, and not to indicate or imply that the device or component referred to must have a specific orientation, be constructed and operated in a specific orientation. Therefore, it cannot be understood as a limitation on the disclosure. In addition, the terms such as "first", "second" and "third are only used to describe the purpose and cannot be understood as indicating or implying relative importance.

In the description of the disclosure, it should be noted that unless otherwise specified and limited, the terms "connected to" and "connection" should be broadly understood, for example, they can be fixed connections, detachable connections, or integrated connection, can be mechanical connections or electrical connections, and can be direct connections or indirect connections through intermediate media. For those skilled in the art, the specific meanings of the above terms in the disclosure can be understood in specific situations.

Specific embodiments of the disclosure are described in further detail below in combination with the attached drawings and embodiments.

Figure 2:
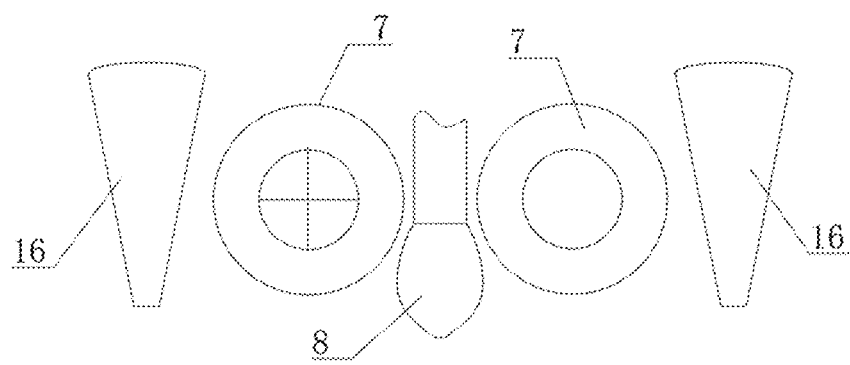
FIG. 2 illustrates a top view of dividers of the self-propelled picking vehicle for pineapples based on scraper transportation according to the embodiment of the disclosure.

Specifically, a self-propelled picking vehicle for pineapples based on scraper transportation is provided. As shown in FIG. 1 and FIG. 2, the self-propelled picking vehicle for pineapples based on scraper transportation includes a baseplate 1, a driving mechanism 2, and a propelling mechanism 3. The driving mechanism 2 is disposed on the baseplate 1, the propelling mechanism 3 is disposed at a lower end of the baseplate 1, and the driving mechanism 2 is connected to the propelling mechanism 3. A horizontal chain conveyor 4 which can be raised and lowered is disposed below the baseplate 1, a cutting plate 6 is disposed above a front end of the horizontal chain conveyor 4. The cutting plate 6 is provided with two disk blades 7, outer sides of the two disk blades are provided with dividers 16, and a fruit protector 8 is disposed between the two disk blades 7. A fruit picking mechanism 9 is disposed at an upper end of the fruit protector 8.

It should be noted that the propelling mechanism 3 can be a wheeled type or a track type. As shown in FIG. 1, the propelling mechanism 3 is the wheeled type, that is, several tires are disposed on two sides of the baseplate 1, which are driven by the driving mechanism 2 to achieve propelling. The driving mechanism 2 selects engine drive mechanism and can use four-wheel drive, front-wheel drive, or rear-wheel drive. The core driving component of the driving mechanism 2 is the engine, and the torque of the engine is transmitted to two or one propelling component through transmission components to achieve the propelling of the pineapple picking vehicle. The specific structure can refer to the driving structure of existing wheeled machinery, such as the driving structure of rollers, bulldozers, etc., and the embodiment is not specifically limited here.

In the specific embodiment, during the propelling of the picking vehicle for pineapples, the fruit picking mechanism 9 rotates to pull the pineapples, then the pineapples are transported to the fruit protector 8, which makes the two disk blades to rotate, thereby cutting stalks and tail leaves of the pineapples on the fruit protector 8. Then the fruit picking mechanism 9 continues to rotate the pineapples, further pulling the pineapples from the fruit protector 8 to the horizontal chain conveyor 4. When the pineapples move on the fruit protector 8, the pineapples will be cut by the two disk blades 7 to ensure the cutting of the stalks and tail leaves of the pineapples, avoiding subsequent leaf removal treatment and improving picking efficiency. The horizontal chain conveyor 4 further transports the pineapples to the rear end of the picking vehicle for pineapples, realizing the transportation of the pineapples. The entire process realizes the automation of pineapple picking, improves the efficiency of pineapple picking and transportation, and greatly reduces the labor intensity of fruit farmers.

In a specific embodiment, the two disk blades 7 is driven to rotate by the cutting motor 15 disposed on the cutting plate 6.

Figure 3:
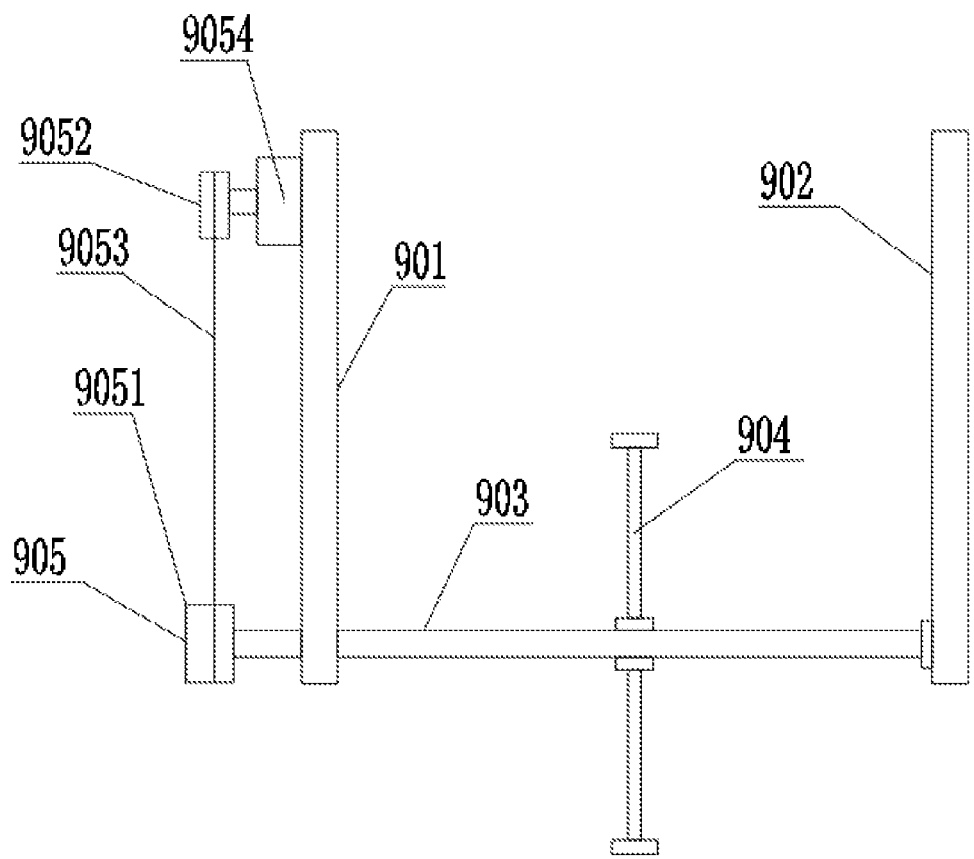
FIG. 3 illustrates a structural diagram of a fruit picking mechanism of the self-propelled picking vehicle for pineapples based on the scraper transportation according to the embodiment of the disclosure.

In an embodiment, the specific structure of the fruit picking mechanism is shown in FIG. 3. The fruit picking mechanism 9 includes a first support 901, a second support 902, a rotating shaft 903, fruit picking plates 904 and a power unit 905. The rotating shaft 903 is rotatably fixed by the first support 901 and the second support 902, and an end of the rotating shaft 903 is connected to an output end of the power unit 905. The fruit picking plates 904 are coaxially connected to the rotating shaft 903.

The specific working principle of the fruit picking mechanism 9 is as follows. The rotating shaft 903 is driven by the power unit 905 to rotate, thereby making the fruit picking plates 904 to rotate. The picked pineapples are moved onto the fruit protector 8 through the rotation of the fruit picking plates 904, and then further moved from the protector 8 towards the horizontal chain conveyor 4. The first support 901 and the second support 902 are installation components, which can be disposed on the frame of the horizontal chain conveyor 4 during working.

In an embodiment, as shown in FIG. 3, the power unit 905 includes a first belt pulley 9051, a second belt pulley 9052, a transmission belt 9053 and a fruit picking motor 9054. The first belt pulley 9051 is coaxially connected to the rotating shaft 903, the first belt pulley 9051 is connected to the second belt pulley 9052 through the transmission belt 9053, and an output end of the fruit picking motor 9054 is coaxially connected to the second belt pulley 9052.

The specific driving structure of the power unit 905 is described above. In the embodiment, the rotating shaft 903 is driven through belts, and the power unit 905 is provided with an independent fruit picking motor 9054 to adjust the rotation speed of the fruit picking plates 904, thereby adapting to the propelling speed of the picking vehicle for pineapples. For example, when the propelling speed of the picking vehicle for pineapples increases, the rotation speed of the fruit picking plates 904 can be adjusted appropriately.

In an embodiment, the fruit picking plates 904 are I-shaped picking plates, and materials of the fruit picking plates 904 are non-rigid rubber products with certain stress.

In an embodiment, the two disk blades 7 are driven to rotate by a hydraulic motor (i.e., a cutting motor 15) disposed on the cutting plate 6.

In an embodiment, the horizontal chain conveyor 4 and the cutting plate 6 located in the front end of the horizontal chain conveyor 4 are connected to the baseplate 1 through a first hydraulic cylinder 10. The cutting plate 6 disposed at the front end of the horizontal chain conveyor 4 is adjusted through the first hydraulic cylinder 10 to adapt to different cutting heights.

Figure 4:
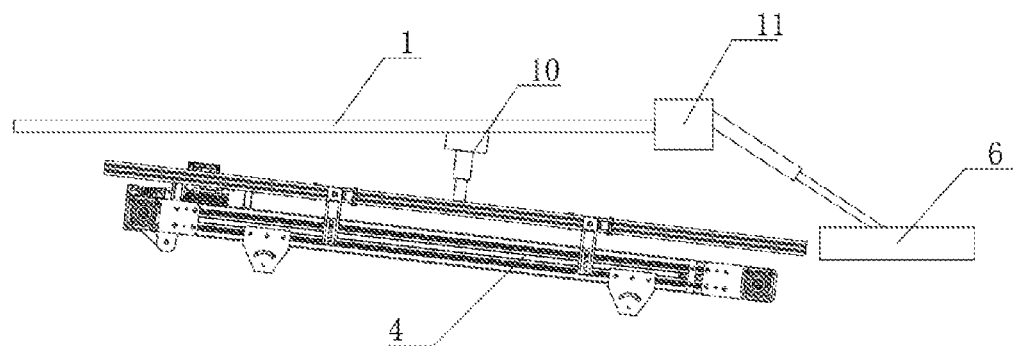
FIG. 4 illustrates a structural diagram of a horizontal chain conveyor of the self-propelled picking vehicle for pineapples based on the scraper transportation according to the embodiment of the disclosure.
Figure 5:
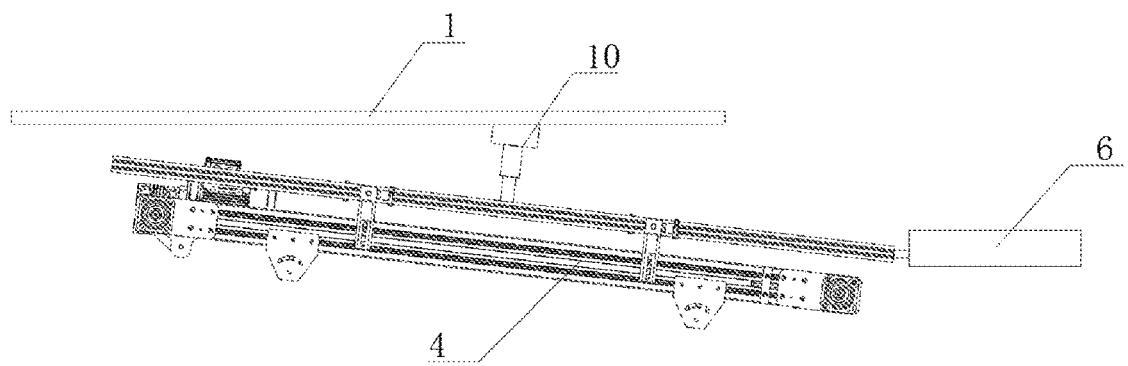
FIG. 5 illustrates another structural diagram of the horizontal chain conveyor of the self-propelled picking vehicle for pineapples based on the scraper transportation according to the embodiment of the disclosure.

Specifically, two hydraulic cylinders of the first hydraulic cylinder 10 and a second hydraulic cylinder 11 can be disposed independently to adjust. As shown in FIG. 4, the first hydraulic cylinder 10 is disposed to adjust the height of the horizontal chain conveyor 4, and the second hydraulic cylinder 11 is disposed to adjust the height of the cutting plate 6. As shown in FIG. 5, the cutting plate 6 can be disposed on the frame of the horizontal chain conveyor 4, and the height of the horizontal chain conveyor 4 can be adjusted through the first hydraulic cylinder 10 to simultaneously adjust the heights of the horizontal chain conveyor 4 and the cutting plate 6, in order to achieve the purpose of height adjustment.

In an embodiment, a vertical rotating and lifting chain conveyor 5 is disposed at a rear of the baseplate 1, and the horizontal chain conveyor 4 is configured to convey picked pineapples to the vertical rotating and lifting chain conveyor 5. The picked pineapples are lifted to the upper part by the vertical rotating and lifting chain conveyor 5, and then concentrated in the cargo box for centralized sorting, in order to achieve automatic collection of the pineapples after picking and improve the efficiency of the pineapple picking and collection.

Figure 6:
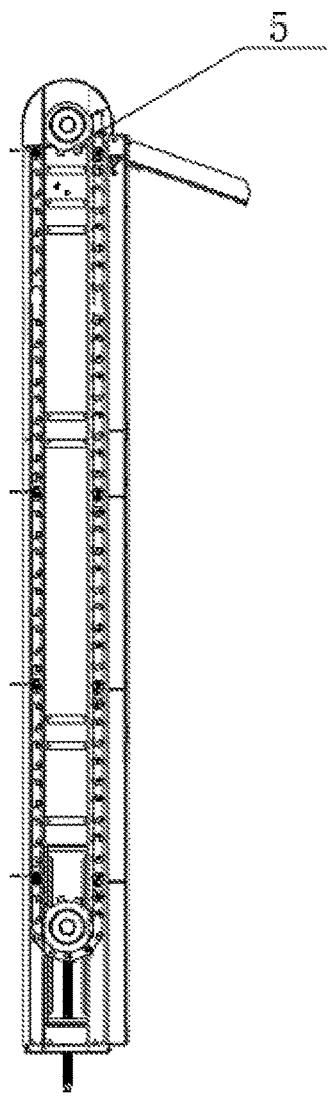
FIG. 6 illustrates a lateral view of a vertical rotating and lifting chain conveyor of the self-propelled picking vehicle for pineapples based on the scraper transportation according to the embodiment of the disclosure.
Figure 7:
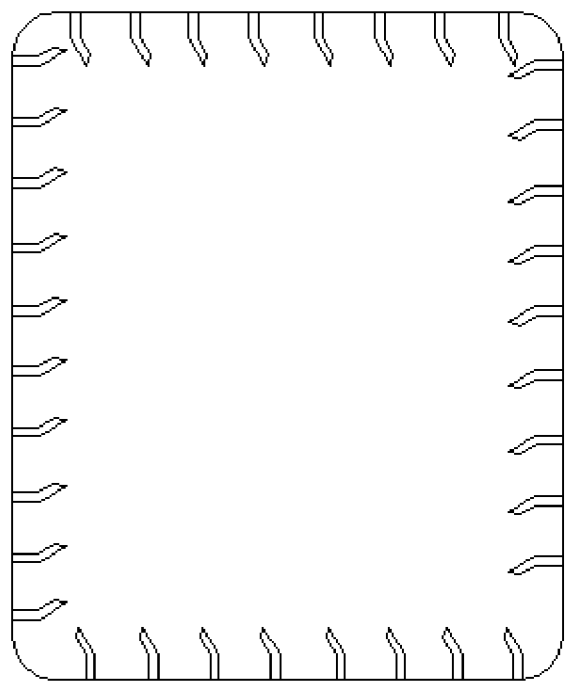
FIG. 7 illustrates a front view of the vertical rotating and lifting chain conveyor of the self-propelled picking vehicle for pineapples based on the scraper transportation according to the embodiment of the disclosure.
Figure 8:
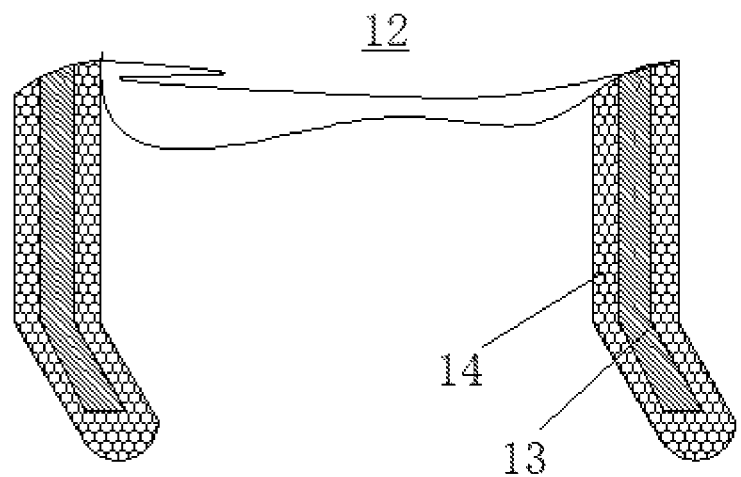
FIG. 8 illustrates a partial enlarged schematic diagram at chain conveyor scrapers of the vertical rotating and lifting chain conveyor of the self-propelled picking vehicle for pineapples based on the scraper transportation according to the embodiment of the disclosure.

In an embodiment, the specific structure of the vertical rotating and lifting chain conveyor 5 is shown in FIGS. 6-8. Impetus of the vertical rotating and lifting chain conveyor 5 is distributed through the driving mechanism 2 and transmitted using chain transmission. Chain conveyor scrapers 12 are sandwich composite materials, a middle of each of the chain conveyor scrapers 12 is a steel plate 13 capable of providing a supporting force, and an outside of each of the chain conveyor scrapers 12 is wrapped by a rubber flexible material 14 to reduce mechanical contact with fruits and damage to the fruits. Each of the chain conveyor scrapers 12 is covered with a flexible rubber product (i.e., the rubber flexible material 14) to protect the fruits.

In an embodiment, the horizontal chain conveyor 4 and the vertical rotating and lifting chain conveyor 5 have relatively independent transmission to rotate independently. As shown in FIG. 1, there is a certain height difference between a tail end of the horizontal chain conveyor 4 and the vertical rotating and lifting chain conveyor 5, and the height difference is in a range of 10-12 centimeters (cm) to ensure that the fruits fall without damage.

In actual use, the cut pineapples fall into the vertical rotating and lifting chain conveyor 5 through horizontal chain conveyor 4. During the lifting process of the vertical rotating and lifting chain conveyor 5, the chain conveyor scrapers 12 can effectively protect the pineapples while assisting in the upward transportation of the pineapples, so as to facilitate centralized collection of the pineapples. The overall automation level is high, the labor intensity of fruit farmers is reduced, and the harvesting efficiency of pineapples is improved.

The above embodiments are only used to illustrate the disclosure and not to limit it. Those skilled in the art can also make various changes and variations without departing from the spirit and scope of the disclosure. Therefore, all equivalent technical solutions also belong to the scope of the disclosure, and the scope of patent protection of the disclosure should be limited by the claims.

What is claimed is:

1. A self-propelled picking vehicle for pineapples based on scraper transportation, comprising: a baseplate (1), a driving mechanism (2), and a propelling mechanism (3); wherein the driving mechanism (2) is disposed on the baseplate (1), the propelling mechanism (3) is disposed at a lower end of the baseplate (1), and the driving mechanism (2) is connected to the propelling mechanism (3); a front end of a horizontal chain conveyor (4) is provided with a cutting plate (6); the cutting plate (6) is provided with two disk blades (7), outer sides of the two disk blades are provided with dividers (16), and a fruit protector (8) is disposed between the two disk blades (7); and a fruit picking mechanism (9) is disposed at an upper end of the fruit protector (8);

wherein the fruit picking mechanism (9) comprises a first support (901), a second support (902), a rotating shaft (903), fruit picking plates (904) and a power unit (905); the rotating shaft (903) is rotatably fixed by the first support (901) and the second support (902), and an end of the rotating shaft (903) is connected to an output end of the power unit (905); the fruit picking plates (904) are coaxially connected to the rotating shaft (903);

wherein a vertical rotating and lifting chain conveyor (5) is disposed at a rear of the baseplate (1), and the horizontal chain conveyor (4) is configured to convey picked pineapples to the vertical rotating and lifting chain conveyor (5);

wherein the horizontal chain conveyor (4) and the cutting plate (6) located in the front end of the horizontal chain conveyor (4) are connected to the baseplate (1) through a hydraulic cylinder (10); the cutting plate (6) disposed at the front end of the horizontal chain conveyor (4) is adjusted through the hydraulic cylinder (10) to adapt to different cutting heights;

wherein impetus of the vertical rotating and lifting chain conveyor (5) is distributed through the driving mechanism (2) and transmitted using chain transmission; chain conveyor scrapers (12) are sandwich composite materials, a middle of each of the chain conveyor scrapers (12) is a steel plate (13) capable of providing a supporting force, and an outside of each of chain conveyor scrapers (12) is wrapped by a rubber flexible material (14) to reduce mechanical contact with fruits and damage to the fruits; and each of the chain conveyor scrapers (12) is covered with the rubber flexible material (14) to protect the fruits; and wherein the horizontal chain conveyor (4) and the vertical rotating and lifting chain conveyor (5) have relatively independent transmission to rotate independently, a height difference is provided between a tail end of the horizontal chain conveyor (4) and the vertical rotating and lifting chain conveyor (5), and the height difference is in a range of 10-12 centimeters (cm) to ensure that the fruits fall without damage.

2. The self-propelled picking vehicle for pineapples based on the scraper transportation as claimed in claim 1, wherein the power unit (905) comprises a first belt pulley (9051), a second belt pulley (9052), a transmission belt (9053) and a fruit picking motor (9054); the first belt pulley (9051) is coaxially connected to the rotating shaft (903), the first belt pulley (9051) is connected to the second belt pulley (9052) through the transmission belt (9053), and an output end of the fruit picking motor (9054) is coaxially connected to the second belt pulley (9052).

3. The self-propelled picking vehicle for pineapples based on the scraper transportation as claimed in claim 1, wherein the fruit picking plates (904) are I-shaped picking plates, and materials of the fruit picking plates (904) are non-rigid rubber products with certain stress.

4. The self-propelled picking vehicle for pineapples based on the scraper transportation as claimed in claim 3, wherein the two disk blades (7) are driven to rotate by a cutting motor (15) disposed on the cutting plate (6).

\* \* \* \* \*